United States Patent [19]

Takemae

[11] Patent Number: 4,743,935
[45] Date of Patent: May 10, 1988

[54] CAMERA SHUTTER CONTROL DEVICE

[76] Inventor: Mikio Takemae, No. 3-409, Nagataminamidai 1-chome, Minami-ku, Yokohama-shi, Kanagawa, Japan

[21] Appl. No.: 906,656

[22] Filed: Sep. 12, 1986

Related U.S. Application Data

[63] Continuation of Ser. No. 670,737, Nov. 13, 1984, abandoned.

[30] Foreign Application Priority Data

Nov. 14, 1983 [JP] Japan ................. 58-213560

[51] Int. Cl.$^4$ .............................. G03B 7/093
[52] U.S. Cl. .................. 354/456; 354/458; 354/238.1; 354/413
[58] Field of Search .............. 354/413, 420, 422, 456, 354/458, 459, 460, 238.1, 129, 137, 145.1, 267.1

[56] References Cited

U.S. PATENT DOCUMENTS

| | | | |
|---|---|---|---|
| 3,798,664 | 3/1974 | Matsuda | 354/459 |
| 4,192,595 | 3/1980 | Wakazono et al. | 354/413 |
| 4,422,747 | 12/1983 | Uchidoi et al. | 354/238.1 |
| 4,456,353 | 6/1984 | Mizokami | 354/456 |
| 4,479,704 | 10/1984 | Masunaga | 354/137 |

Primary Examiner—Russell E. Adams

[57] ABSTRACT

In a shutter speed control device for a camera, a shutter speed is changed by varying a period of time from a reference time instant to a time of shutter opening. A first signal is produced which is representative of a duration from the reference time instant to the time of shutter opening, and a second signal is produced which is representative of a desired shutter speed. A detection signal is produced in response to the first and second signals, which is representative of the time of shutter closing corresponding to the desired shutter speed.

7 Claims, 4 Drawing Sheets

CAMERA SHUTTER CONTROL DEVICE

This application is a continuation of application Ser. No. 670,737, filed Nov. 13, 1984, now abandoned.

BACKGROUND OF THE INVENTION

1. Field of the Invention

The present invention relates to a camera shutter control device in which a shutter speed can be changed by varying the period of time from a reference time instant set in connection with a shutter releasing operation to a time instant of a shutter opening operation.

2. Description of the Prior Art

Conventionally, two types of camera focal plane shutter controls have been known, one of which is a mechanical shutter control in which a locking member of a leading curtain of a shutter is released in response to a shutter releasing operation, thereby allowing the leading curtain to run, and simultaneously a mechanical delay device is actuated so that the engagement of a trailing curtain with a locking member is released after lapse of a time manually preset by a shutter dial. The other type is of an electromagnetic shutter control in which the leading curtain locking member releases the engagement of the leading curtain in response to the releasing operation, and simultaneously a timer circuit starts measuring a time in response to a trigger signal generated in connection with the releasing operation. When the timer circuit detects a lapse of a predetermined period of time preset by a shutter dial or an automatic exposure control circuit, a signal is fed to an electric magnetic circuit provided in association with the trailing curtain, thereby releasing the engagement of the trailing curtain.

The mechanical shutter control can further be classified into two types, one of which is of the type in which a period of time from a time instant of depression of a shutter button to a time instant of releasing the trailing curtain is adjusted in accordance with a shutter speed to make constant the period of time from the time instant of depression of the shutter button to the time instant of releasing the leading curtain. The other type of the mechanical shutter control is of the type in which as disclosed in U.S. Pat. No. 4,044,368, the period of time from the time instant of depression of the shutter button to a time instant of releasing the leading curtain is adjusted in accordance with a shutter speed to make constant the period of time from the time instant of depression of the shutter button to the time instant of releasing the trailing curtain.

SUMMARY OF THE INVENTION

An object of the present invention is to provide a shutter control device for a camera of the type in which the shutter speed can be varied by changing a period of time from a reference time instant to a time instant of a shutter opening operation, in which photographing with the use of an electric flash device can be performed accurately at a shutter speed synchronized with flash emission by the electronic flash device.

To attain the above-mentioned object, according to the present invention, in the camera in which the shutter speed can be changed by varying the period of time from a reference time instant to a time instant of a focal plane shutter opening operation, a first signal is produced corresponding to the period of time from the reference time instant to the time instant of the shutter opening operation and a second signal is produced corresponding to a synchronized speed with flash emission by the electronic flash device, so that in flash photographing, the shutter closing operation is performed on the basis of the first and second signals when the sum of the period of time corresponding to the synchronized shutter speed measured from the reference time instant and the period of time from the reference time instant to the time instant of the shutter opening operation have elapsed.

In the thus constructed camera shutter device, even if the period of time from the reference time instant to the time instant of the shutter opening operation is varied, an accurate synchronized shutter speed can be obtained at the time of flash photographing by incorporating the varied period of time into the period of time from the reference time instant to the time instant of the shutter closing operation.

Other features and advantages of the invention will be apparent from the following description taken in conjunction with the accompanying drawings:

DETAILED DESCRIPTION OF THE PREFERRED EMBODIMENTS

Referring to the drawings, a preferred embodiment of the present invention will be described.

Figure 1:
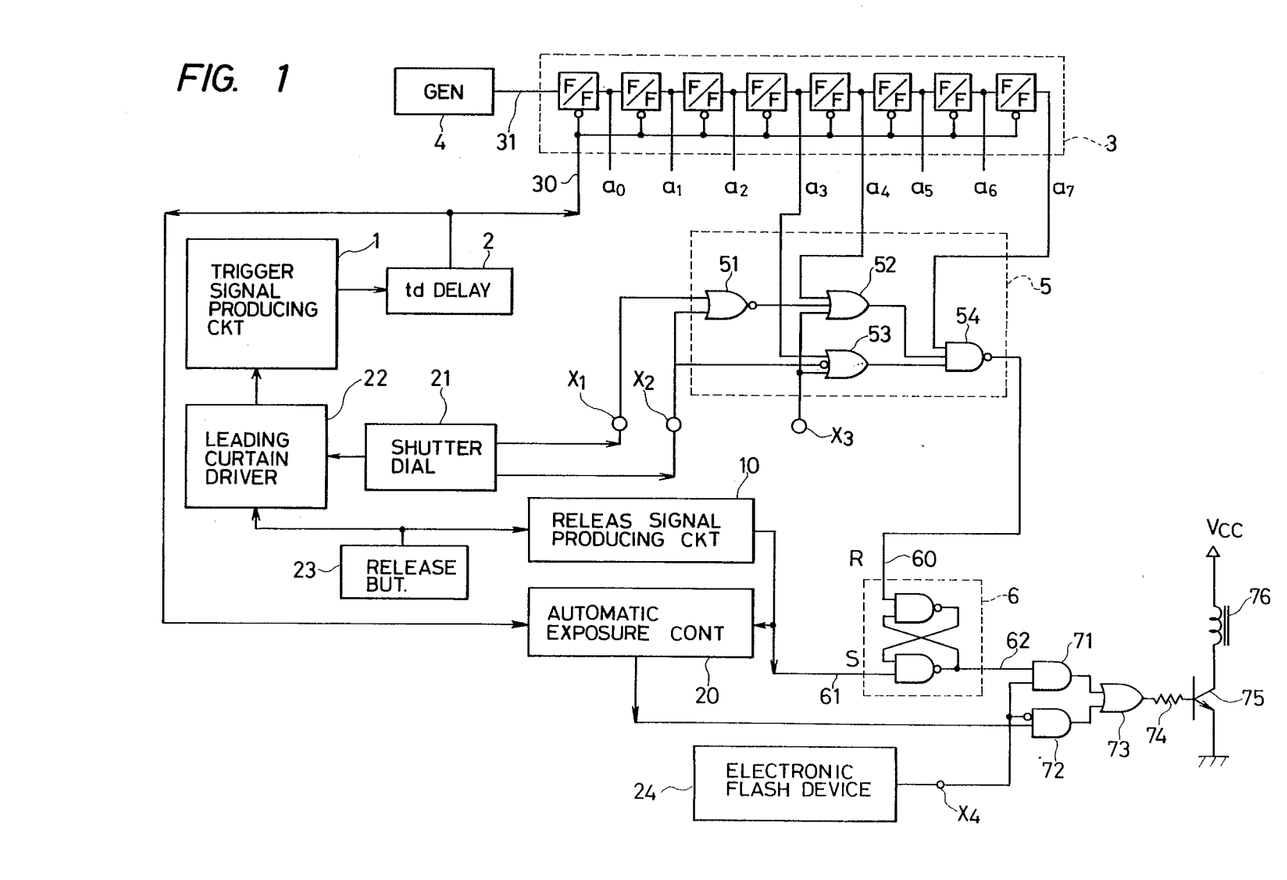
FIG. 1 is a circuit diagram showing an embodiment of the present invention.

FIG. 1 shows an embodiment of the shutter control device according to the present invention, in which is illustrated an electric circuit of the shutter control device adapted to perform mechanical shutter control as well as electromagnetic shutter control.

In FIG. 1, a trigger signal producing circuit 1 produces a trigger signal in response to the mechanical release of a first member of a shutter such as a leading curtain from a leading curtain locking member (not shown) by a leading curtain driver 22 in response to a release operation such as depression of a release button 23. A delay circuit 2 is provided for delaying the trigger signal by a period of time td.

An output signal from the delay circuit 2 is applied to a reset terminal 30 of a binary counter 3. The binary counter 3 is an 8-bit binary counter constituted with at least eight flip-flops connected in series to one another and provided with an input terminal 31 to which is supplied an output pulse from an oscillating circuit having an oscillation frequency of 32768 Hz.

Upon reception of the output signal from the delay circuit 2 at the reset terminal 30 of the binary counter 30 the, latter begins counting (frequency dividing) and produces a high (hereinafter referred to as "H") level signal at its output terminal $a_3$ as a correction time signal after a lapse of time of 1/4000 sec. from the count starting time, an H-level signal at its output terminal $a_4$ as a correction time signal after a lapse of time of 1/2000 sec., and an H-level signal at its output terminal $a_7$ as a reference time signal after a lapse of time of 1/250 sec.

A logic circuit 5 is constituted with a NOR gate 51, OR gates 52 and 53, and a NAND gate 54.

The NOR gate 51 has a pair of input terminals, one of which is connected to a first terminal $X_1$ to which an H-level signal is applied when a shutter speed of 1/2000 sec. is manually set by a shutter dial 21 as the manual shutter speed to be performed by mechanical shutter control. The other input terminal of the NOR gate 51 is connected to a second terminal $X_2$ to which an H-level signal is applied when a shutter speed of 1/4000 sec. is manually set by a shutter dial 21 as the manual shutter speed to be performed by mechanical shutter control.

The OR gate 52 has three input terminals wherein, a first terminal is connected to the output terminal $a_4$ of the binary counter 3, a second terminal is connected to the output terminal of the NOR gate 51, and a third terminal is connected to a third terminal $X_3$ which produces an H-level signal when an ordinary shutter (to be described later) is incorporated into a camera and a low (hereinafter referred to as "L") signal when a special shutter according to the present invention (to be described later) is incorporated into the camera.

The OR gate 53 has three input terminals wherein, a first terminal is connected to the output terminal $a_3$ of the binary counter 3, a second terminal is connected to the third terminal $X_3$, and a third terminal receives an output signal of the second terminal $X_2$ in a negative logic.

The NAND gate 54 has three input terminals which are connected respectively to the output terminal $a_7$ of the binary counter 3, the output terminal of the OR gate 52, and to the output terminal of the OR gate 53.

The output terminal of the NAND gate 54 is connected to a reset terminal 60 of a flip-flop 6. A set terminal 61 of the flip-flop 6 is connected to a release signal producing circuit 10 which produces a release signal (L-level pulse) at the time of releasing the shutter (upon depression of a release button and before running of the leading curtain). The flip-flop 6 produces an H-level signal from its output terminal 62 upon reception of the release signal at its set terminal 61. The release signal applied to terminal 61 is an L-Level during the period from the depression of the release button till the start of running of the leading curtain.

The output terminal 62 of the flip-flop 6 is connected to one of the input terminals of an AND gate 71. The remaining input terminal of the AND gate 71 is connected to a fourth terminal $X_4$ on which an H-level signal appears when a power source for an electronic flash device 24 is turned on for each photograph or when a main capacitor in the electronic flash device 24 has been completely charged.

The fourth terminal $X_4$ is also connected to an inverted input terminal of an AND gate 72, the other input terminal of which is supplied with a signal from an automatic exposure control circuit 20 which is connected to the release signal producing circuit 10 and the delay circuit 2. The signal produced from the automatic exposure control circuit 20 is a signal indicative of a proper shutter time (a signal for controlling a second member of the shutter such as a trailing curtain) in an automatic exposure photographing mode.

The respective output terminals of the AND gates 71 and 72 are connected to the input terminals of an OR gate 73. The output terminal of the OR gate 73 is connected to the base of a transistor 75 through a resistor 74. An electromagnet 76 for attracting the trailing curtain is connected between a power source $V_{cc}$ and the transistor 75.

The operation of the circuit will be described. First, description will be made as the case where a manual shutter speed is set by a shutter dial 21 (a manual exposure control mode) and the set manual shutter speed is obtained by a mechanical shutter control.

The entire circuit shown in FIG. 1 can also operate in an automatic exposure control mode, but in the manual exposure control mode in which the shutter speed is set by the shutter dial 21, the automatic exposure control circuit 20 stops its operation.

Accordingly, a shutter time corresponding to 1/250 sec. (or a value added with correction) is produced from the output terminal 61 of the flip-flop 6 at every shutter releasing operation both in the automatic and manual exposure control modes as will be described later.

Whichever the automatic or manual exposure control mode may be selected, the electromagnet 76 is controlled through the OR gate 73 and the transistor 75 when the power source of the electronic flash device 24 is ON because the AND gate 71 is enabled. On the other hand, electromagnet 76 is not controlled when the power source of the electronic flash device 24 is OFF, i.e., when the level of the input signal to the fourth terminal $X_4$ is L. In this case, the AND gate 71 is disabled.

When the manual exposure control mode is selected, the automatic exposure control circuit 20 is disabled and thus one input of the AND gate 72 becomes L. Therefore, when the electronic flash device 24 is OFF in this condition, both the AND gates 71 and 72 are disabled and produce L-level output signals and hence the electromagnet 76 can not be controlled. That is, in the maanual exposure control mode without flash operation, mechanical shutter control is performed.

Figure 2:
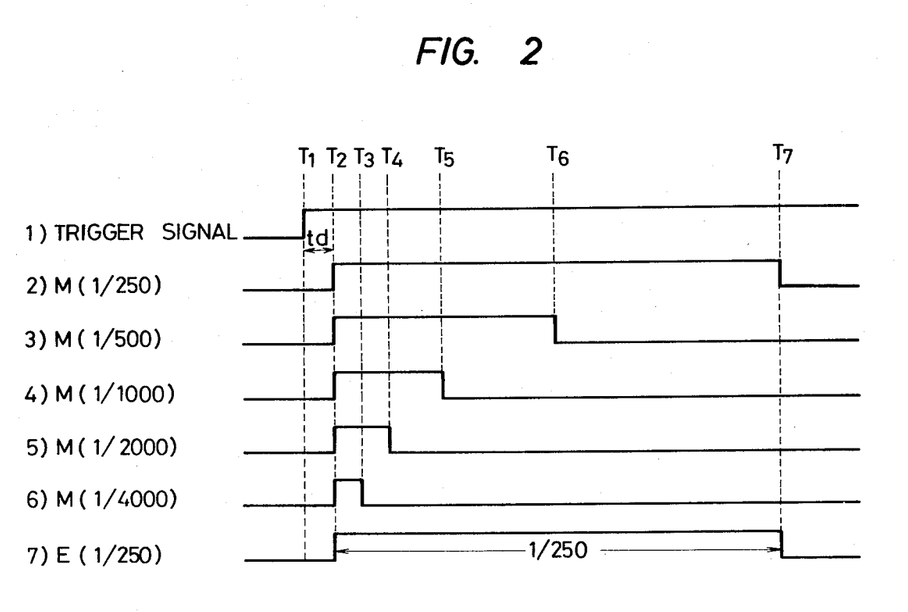
FIG. 2 is a time chart of various signals in the case where an ordinary shutter is incorporated.
Figure 3:
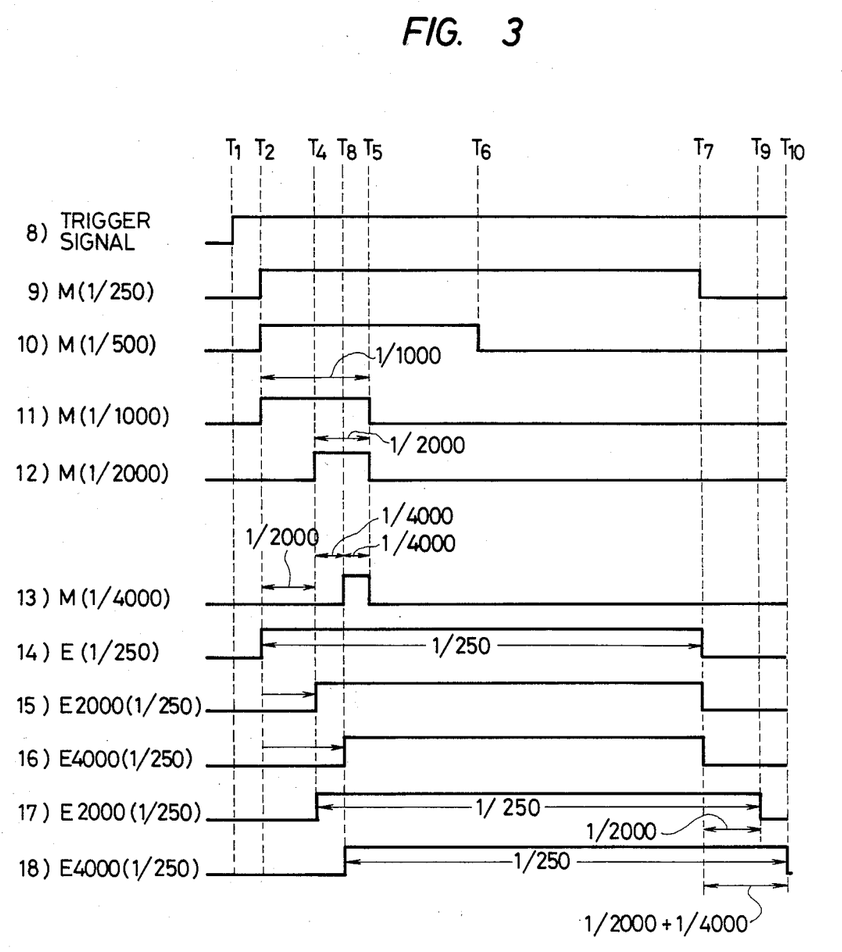
FIG. 3 is a time chart of various signals in the case where a special shutter is incorporated.

In the case where an ordinary shutter is incorporated, a first fixed length of time from trigger signal generating timing $T_1$, as shown in FIG. 2(1), operated upon depression of the release button 23, to leading curtain starting time $T_2$, or reference time instant, as shown in FIG. 2(2)-(6), is always constant. At time $T_2$, the locking of the leading curtain is released by a mechanical linking mechanism of the shutter. The first determined period of time from $T_2$ to the starting timing $T_3$ to $T_7$ of the trailing curtain is varied in accordance with the setting of shutter speed. In the case where a special shutter is incorporated, control is made in the same manner as in the case of the ordinary shutter in a range from a low shutter speed at a second fixed length of time (1/250) to a certain shutter speed (1/1000) as shown in FIG. 3(9)-(11), while in a range where the shutter speed is faster than 1/1000, as shown in (12) and (13) of FIG. 3, the leading curtain releasing timings $T_4$ and $T_8$ are delayed as the setting shutter speed is made faster. The trailing curtain releasing timing $T_5$ at which the trailing curtain is released is fixed, independently of the shutter speed, to a time where second predetermined period of time has elapsed from the trigger signal generating timing $T_1$. The mechanical shutter control is performed in this manner. The leading curtain starting timing $T_2$ at which the leading curtain is released is ordinarily referred to as a reference time instant.

Next, description will be made as to the operation when the power source of the electronic flash device 24 is switched on where a manual shutter speed is set by the shutter dial and the set shutter speed is to be obtained by the mechanical shutter control in the case where an ordinary shutter is incorporated into a camera.

In the case where an ordinary shutter is incorporated into a camera, an H-level signal is produced from the third terminal $X_3$ so that an H-level signal is always produced from each of the OR gates 52 and 53 independently of the signals produced from the output terminals $a_3$ and $a_4$ and of the signals from the first and second terminals $X_1$ and $X_2$. Accordingly, the NAND gate 54 supplies an L-level reset signal to the reset terminal 60 of the flip-flop 6 when an H-level signal is produced from the output terminal $a_7$ (timing $T_7$) as a reference timing signal at the second fixed length of time for a shutter speed of 1/250 sec. after the release button 23 is depressed (that is after the shutter leading curtain runs).

Since an H-level signal is supplied from the fourth terminal $X_4$ when the power source of the electronic flash device 24 is switched on, the AND gate 72 produces an L-level signal. Accordingly, the transistor 75 is not controlled by the automatic exposure control circuit 20 but by the signal from the flip-flop 6. The transistor 75 is rendered conductive from the time instant when the release button 23 is depressed (before the leading curtain is released) till the output terminal $a_7$ produces the H-level signal. During this period of time the electromagnet 76 is energized to cause the trailing curtain to be engaged and stopped by the trailing curtain locking member.

Thus, even if the leading curtain runs upon depression of the release button 23 and the engagement of the trailing curtain is release, the locking of the trailing curtain is held by the electromagnetic shutter control. When the period of time corresponding to a shutter speed synchronized with flash emission has elapsed and an H-level signal is produced from the output terminal $a_7$, the engagement of the trailing curtain with the trailing curtain locking member is released by the energization of the electromagnet 76 and the trailing curtain is allowed to run ($T_7$). Thus, the shutter speed of 1/250 synchronized with flash emission is correctly obtained.

Description will next be made as to the case where an ordinary shutter is incorporated and the shutter dial 21 is rotated from a manual shutter speed setting position (M:1/250–M:1/4000, etc.) to an automatic exposure control position, that is, the case in which the automatic exposure control mode is selected. In this case, the trailing curtain locking member for mechanical shutter control is disabled and the trailing curtain is controlled only by the trailing curtain locking member for electromagnetic shutter control which is controlled by the automatic exposure control circuit 20.

When the power source of the electronic flash device 24 is not switched on, the AND gate 71 produces always an L-level output. If the release button is depressed in this state (before releasing the leading curtain), a signal is fed from the release signal producing circuit 10 to the automatic exposure control circuit 20 which is turn produces an H-level signal that is fed to the transistor 75 through the AND gate 72 and the OR gate 73. Thus, the transistor 75 is rendered conductive and the electromagnet 76 is energized, so that the trailing curtain is engaged and locked with the trailing curtain locking member for electromagnetic shutter control. Thereafter, when a signal is fed from the delay circuit 2 to the automatic exposure control circuit 20 in coincidence with the running of the leading curtain, the automatic exposure control circuit 20 measures a time by a timer circuit incorporated therein and produces an L-level signal when the time corresponding to a shutter speed for obtaining a proper exposure has elapsed. Thus, the transistor 75 is rendered non-conductive, so that the electromagnet 76 is deenergized and the engagement of trailing curtain is released, thereby allowing the trailing curtain to run.

The operation in the case where the shutter dial is rotated to an automatic exposure control position (that is when the automatic exposure control mode is selected) and the power source for the electronic flash device 24 is switched on, is the same as the operation in the case where the shutter dial is rotated into a manual speed setting position (M:1/250–M:1/4000, etc.) (that is, when the manual exposure control mode is selected) to perform the mechanical shutter control, and therefore description is omitted herein. In this case, the trailing curtain locking member for mechanical shutter control does not operate.

Next, description will be made as to the case where a specific shutter according to the present invention is incorporated in a camera and the third terminal $X_3$ produces an L-level signal.

First, description is made as to the operation when the power source for the electronic flash device 24 is switched on (the level at the fourth terminal $X_4$ is H) in the state where a manual shutter speed is set by the shutter dial (that is, in the manual exposure control mode) and the set manual shutter speed is to be obtained. In this case, the AND gate 72 always produce an L-level output.

If the shutter speed is set by the shutter dial to a value equal to or slower than 1/1000 sec. when the power source for the electronic flash device 24 is switched on, L-level signals are always applied to the first and second terminals $X_1$ and $X_2$.

Accordingly, the output of the NOR gate 51 is H so that the output of the OR gate 52 becomes always H independently of the output at the output terminals $a_4$. Further, the L-level signal from the second terminal $X_2$ is invertedly applied to the OR gate 53, and the output of the OR gate 53 becomes always H independently of the output at the output terminal $a_3$.

Accordingly, operations are performed in this case in the same manner, as described before, as performed in the case where an ordinary shutter is incorporated and the power source for the electronic flash device 24 is switched on in the condition that a manual shutter speed is set. That is, if the release button 23 is depressed (at $T_1$), the shutter leading curtain runs at the leading curtain starting time (at $T_2$) after a predetermined period of time has elapsed (with a delay of td), and the output terminal $a_7$ produces an L-level signal for a period from the leading curtain starting timing $T_2$ until the binary counter 3 has completed to count 1/250 sec. During this period of time, an H-level signal from the release signal producing circuit 10 is fed to the transistor 75 through the flip-flop 6, the AND gate 71, and the OR gate 73, so that the electromagnet 76 engages with and stops the trailing curtain to prevent the trailing curtain from running even if the trailing curtain locking member for mechanical shutter control releases the trailing curtain as shown in FIG. 3(9)–(11) ($T_5$–$T_7$).

When the output terminal $a_7$ produces an H-level signal (at $T_7$) after 1/250 sec. has been measured, the output of the flip-flop 6 is inverted by the reset signal from the NAND gate 54, the transistor 75 is rendered non-conductive, the electromagnet 76 is deenergized, and the trailing curtain is released by the electromagnetic shutter control as shown in FIG. 3(14). Therefore, the trailing curtain is caused to run. In this way, according to the signal (14) as shown in FIG. 3, a 1/250 sec. shutter speed synchronized with flash emission by the electronic flash device 24 is correctly obtained.

Next, referring to FIG. 4, description will be made as to the case in which a manual shutter speed of 1/2000 sec. as shown in FIG. 3(12) is set by the shutter dial 21 (the mechanical shutter control). In this case, the input to the first terminal $X_1$ becomes H. Therefore, the output of the NOR gate 51 becomes L and the signal fed from the output terminal $a_4$ is outputted from the OR gate 52. Since the output from the second terminal $X_2$ is L, the output of the OR gate 53 is maintained at H. Accordingly, when all the three input signals to the NAND gate 54 become H, that is, when the H-level output signal from the output terminal $a_7$ as shown in FIG. 4(c) and the H-level output signal from the output terminal $a_4$ as shown in FIG. 4(b) are applied in the NAND gate 54, the NAND gate 54 produces a reset signal (L-level), as shown in FIG. 4(d), which is applied to the flip-flop 6.

That is, the following operations are performed when the flash photographing by the electronic flash device 24 is effected in the state where a shutter speed of 1/2000 sec. is set. When the release button 23 is depressed, a trigger signal is produced from the trigger signal producing circuit 1 (at $T_1$). Before the delay time of td has elapsed, the release signal producing circuit 10 produces a release signal (it may be at the timing $T_1$). The flip-flop 6 is, therefore, set to produce an H-level signal. At this time, since the fourth terminal $X_4$ is at H due to the on-state of the power source of the electronic flash device 24, the H-level output of the flip-flop 6 is fed to the transistor 75 through the AND gate 71 and the OR gate 73. As a result, the electromagnet 75 is energized and the trailing curtain is engaged and stopped by the trailing curtain locking member for electromagnetic shutter control.

When the delay time of td has elapsed (at $T_2$), the binary counter 3 starts counting. But the shutter leading curtain does not run. The special shutter is arranged such that the leading curtain locking member is actuated by means of a mechanical linking mechanism linked with the depression of the release button independently of the binary counter 3 to thereby release the leading curtain ($T_4$), at the time instant at which a period of (td+1/2000) seconds has elapsed from the trigger signal generating timing ($T_1$) upon depressing the shutter button.

The timing (in this case, td+1/2000) of releasing the locking curtain by the mechanical linking mechanism is set in the leading curtain driver 22 by the shutter dial 21. When the leading curtain is released to allow the leading curtain to run and a period of (td+1/1000) seconds has elapsed from the trigger signal generator ($T_1$) upon depressing the release button, the trailing locking member for mechanical shutter control releases the trailing curtain by means of mechanical shutter control ($T_5$).

The electromagnet 76 is, however, in energized state at this time, and the trailing curtain locking member for electromagnetic shutter control engages with and stops the trailing curtain. When both input terminals $a_4$ and $a_7$ of the binary counter 3 produce an H-level signal ($T_9$) as shown in FIG. 4(b) and 4(c), the NAND gate 54 sends a reset signal (L-level) to the flip-flop 6 so that the output of the flip-flop 6 becomes L. Thus, the transistor 75 is rendered non-conductive and the electromagnet 76 is deenergized, so that the trailing curtain locked by the trailing curtain locking member for electromagnetic shutter control is released to allow the trailing curtain to run ($T_9$). In the manner as described above, a shutter speed (1/250 sec.) synchronized with flash emission by the electronic flash device 24 can be correctly obtained, as shown in FIG. 3(17), by delaying the release of the trailing curtain through electromagnetic shutter control by a period (1/2000 sec.) by which the leading curtain release has been delayed due to the special shutter.

Next, description will be made as to the case in which a manual shutter speed of 1/4000 as shown in FIG. 3(13) is set by the shutter dial 21 (by the mechanical shutter control). In this case, the output of the second terminal $X_2$ becomes H and the signals from the output terminals $a_4$ and $a_3$ are respectively passed through the OR gates 52 and 53.

Figure 4:
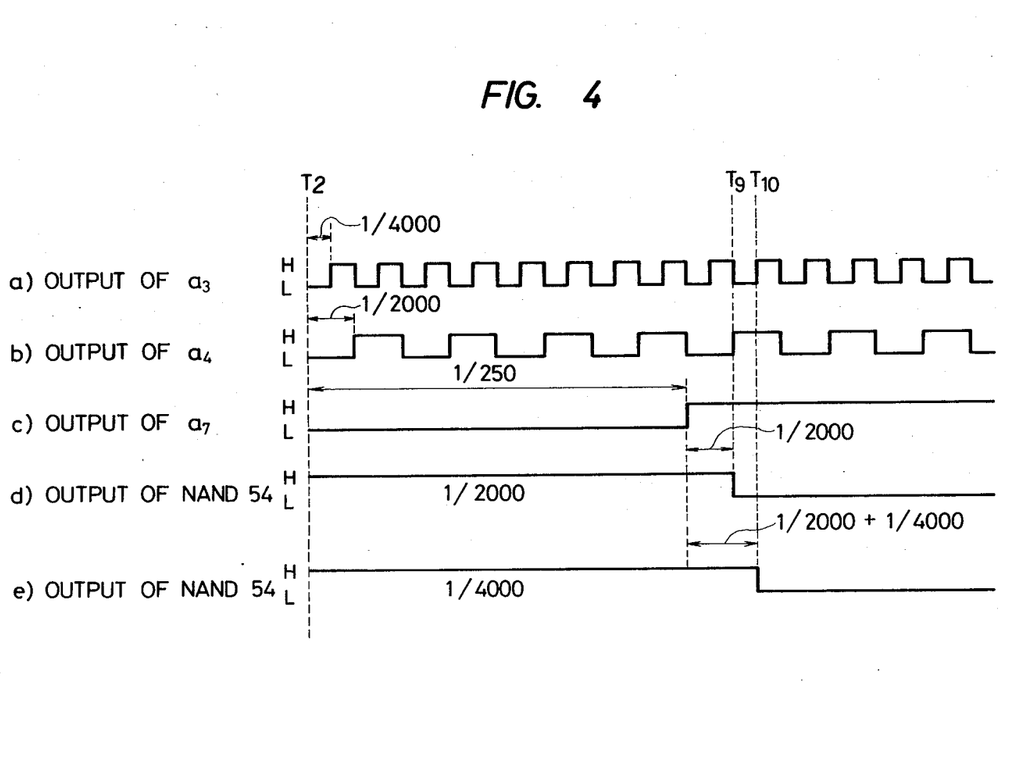
FIG. 4 is a time chart of various signals in the device according to the present invention.

Accordingly, when all the three input signals to the NAND gate 54 become H, that is when the H-level output signal from the output terminal $a_7$ as shown in FIG. 4(c), the H-level output signal from the output terminal $a_4$ as shown in FIG. 4(b), and the H-level output signal from the output terminal $a_3$ as shown in FIG. 4(a) are simultaneously applied to the NAND gate 54, the NAND gate 54 produces a reset signal to be fed to the flip-flop 6 as shown in FIG. 4(e).

That is, if flash photographing by the electronic flash device 24 is performed when a shutter speed of 1/4000 sec. is set, the same operation is effected in this case as in the above-mentioned case in which a shutter speed of 1/2000 sec. is set. The leading curtain driver 22 is controlled by the shutter dial 21 such that the shutter leading curtain is released at a time instant when a period of (td+1/2000+1/4000) seconds has elapsed from the trigger signal generating timing ($T_1$). The release of the trailing curtain effected by electromagnetic shutter control is performed when the levels of all the output signals from the output terminals $a_3$, $a_4$, and $a_7$ of the binary counter 3 become H ($T_{10}$).

In the manner as described above, a correct shutter speed synchronized with flash emission by the electronic flash device 24 can be obtained as shown in FIG. 3(18) by delaying the release of the trailing curtain by the electromagnetic shutter control by a period of (1/2000+1/4000) sec. by which the release of the trailing curtain is delayed according to the special shutter.

Next, description will be made as to the case in which the special shutter is incorporated and photographing is performed in the automatic exposure control mode. If the shutter dial 21 is rotated from a manual shutter speed setting position (M:1/250–M:1/4000, etc.) to an automatic exposure control position, the special shutter actuates the leading curtain locking member by a mechanical linking mechanism of the special shutter to release the locking of the trailing curtain at a time instant ($T_2$) delayed by a period of time (td) from the trigger signal generating timing ($T_1$).

This applies to every case to obtain any shutter speed (1/250–1/4000) sec. The trailing curtain locking member for mechanical shutter control is made inoperable and the trailing curtain is controlled only by the trailing curtain locking member for electromagnetic shutter control which is restricted by the automatic exposure control circuit 20. Accordingly, the operation in this case is the same as in the case of automatic exposure photographing by using an ordinary shutter.

The operation upon energizing the electronic flash device 24 in this state is also the same as that in automatic exposure photographing by using an ordinary shutter.

Although the td-delay circuit 2 is provided for compensating for the mechanical delay between the trigger signal generating timing and the leading curtain starting timing, it is possible to make td zero through mechanical adjustment. In such a case, the td-delay circuit 2 becomes unnecessary.

Although description has been made, in the embodiment, as to the cases in which the shutter is controlled at a shutter speed equal to or faster than 1/250 seconds by the mechanical shutter control, it is apparent that the shutter can be controlled so as to be a lower speed than 1/250 seconds. In this case, either in the case of an ordinary shutter or in the case of a special shutter, if the power source for the electronic flash device 24 is switched on to perform flash photographing under the condition of the mechanical shutter control, the trailing curtain locking member for mechanical shutter control engages with and stops the trailing curtain even after the trailing curtain locking member for electromagnetic shutter control has released the trailing curtain so that the trailing curtain is allowed to run at a time instant when the shutter speed set by the shutter dial is obtained.

Further, although description has been made, in a preferred embodiment, as to the case in which the special shutter is used, the present invention can be applied to any camera in which the the shutter speed can be changed by varying the period of time from a reference time instant in connection with the shutter releasing operation to a time instant of the shutter opening operation.

What is claimed is:

1. A camera comprising:
   (a) a shutter having a first member for opening said shutter and a second member for closing said shutter, the time during which said shutter is open being the shutter speed;
   (b) a shutter release button;
   (c) means responsive to the operation of said shutter release button for opening said shutter by releasing said first member at a first release time;
   (d) means for changing said shutter speed to adjust the duration of a first predetermined time period starting at a reference time instant and ending at said first release time, said reference time instant following activation of said shutter release button by a first fixed length of time;
   (e) means for generating a first detection signal at the completion of a second fixed length of time which begins at said reference time instant;
   (f) means for generating a second detection signal at the completion of a second predetermined time period which begins at the generation of said first detection signal and has a duration substantially equal to said first predetermined time period; and
   (g) means responsive to said second detection signal for closing said shutter by releasing said second member.

2. A camera according to claim 1, wherein said first fixed length of time is substantially equal to the shortest length of time of said first predetermined time period.

3. A camera according to claim 2, wherein said first fixed length of time is shorter than said second fixed length of time.

4. A camera according to claim 3, which further comprises means for emitting a flash toward an object to be photographed, and wherein said second fixed length of time is substantially, equal to the shutter speed which is synchronized with the flash emission by said flash emitting means.

5. A camera comprising:
   (a) a shutter having a first member for opening said shutter and a second member for closing said shutter, the time during which said shutter is opened being the shutter speed;
   (b) a shutter release button;
   (c) means responsive to the operation of said shutter release button for opening said shutter by releasing said first member to open said shutter at a first release time;
   (d) means for changing said shutter speed to adjust the duration of a first predetermined time period starting at a reference time instant and ending at said first release time, said reference time instant following activation of said shutter release button by a first fixed length of time;
   (e) means for generating a detection signal in response to a completion of a second predetermined time period which begins at said reference time instant and runs for a length of time which is the sum of a second fixed length of time and a length of time substantially equal to the length of said first predetermined period of time; and
   (f) means responsive to said detection signal for closing said shutter by releasing said second member.

6. A camera according to claim 5, wherein said first fixed length of time is substantially equal to the shortest length of time of said first predetermined period of time.

7. A camera according to claim 6, wherein said first fixed length of time is shorter than said second fixed length of time.

* * * * *

UNITED STATES PATENT AND TRADEMARK OFFICE
CERTIFICATE OF CORRECTION

PATENT NO.   :   4,743,935

DATED        :   May 10, 1988

INVENTOR(S)  :   Mikio Takemae

It is certified that error appears in the above-identified patent and that said Letters Patent is hereby corrected as shown below:

Title page:

"Nippon Kogaku K.K." should be added as the Assignee.

Signed and Sealed this

Twenty-first Day of February, 1989

*Attest:*

DONALD J. QUIGG

*Attesting Officer*        *Commissioner of Patents and Trademarks*